United States Patent [19]

Krantz

[11] Patent Number: 5,190,321

[45] Date of Patent: Mar. 2, 1993

[54] ARRANGEMENT FOR MOUNTING A TUBE OR MEMBER PROVIDED WITH A FLANGE

[75] Inventor: Anders Krantz, Söderala, Sweden

[73] Assignee: Airchitect I Soderhamn AB, Söderhamn, Sweden

[21] Appl. No.: 781,202

[22] PCT Filed: May 22, 1990

[86] PCT No.: PCT/SE90/00342

§ 371 Date: Dec. 12, 1991

§ 102(e) Date: Dec. 12, 1991

[87] PCT Pub. No.: WO90/14542

PCT Pub. Date: Nov. 29, 1990

[30] Foreign Application Priority Data

May 25, 1989 [SE] Sweden .................. 8901871

[51] Int. Cl.$^5$ ................................. F16L 5/02
[52] U.S. Cl. ...................... 285/192; 285/39; 285/358
[58] Field of Search ............ 285/358, 394, 159, 178, 285/194, 192, 205, 359, 395, 39

[56] References Cited

U.S. PATENT DOCUMENTS

| 176,241 | 4/1876 | Price | 285/358 X |
|---|---|---|---|
| 1,533,875 | 4/1925 | McCleary | 285/358 X |
| 1,927,163 | 9/1933 | Fisher | 285/205 X |
| 2,052,394 | 8/1936 | Fullman | 285/205 X |
| 4,036,512 | 7/1977 | Francis | 285/359 X |

FOREIGN PATENT DOCUMENTS 284022 10/1952 Switzerland .............. 285/359

Primary Examiner—Dave W. Arola
Attorney, Agent, or Firm—McFadden, Fincham, Marcus & Anissimoff

[57] ABSTRACT

An arrangement for mounting a tube (4) provided with a flange in a hole (3) formed in a wall (2) comprises a locking ring (8) with at least three peripherally spaced apart seats (10) adapted to cooperate with a corresponding number of pins (9) which are fixed to the wall and which each have an oblique surface against which a cam surface (13) provided adjacent to the seat (10) on the periphery of the locking ring is arranged to be applied so that, when the locking ring is turned, the locking ring is urged against the wall in order to compress an elastic sealing ring (7) provided between the locking ring and the wall.

6 Claims, 2 Drawing Sheets

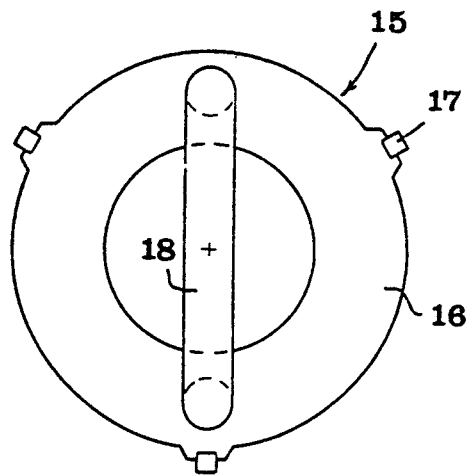
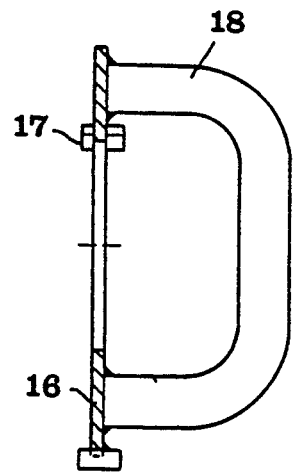
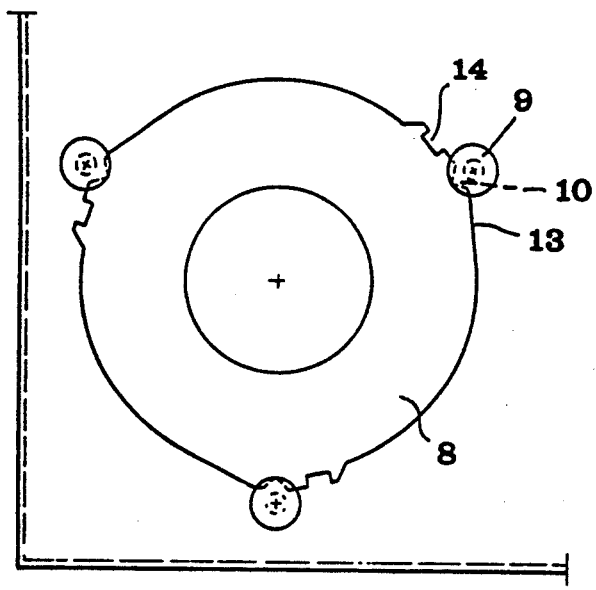
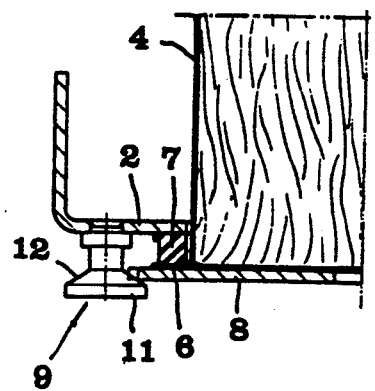

ARRANGEMENT FOR MOUNTING A TUBE OR MEMBER PROVIDED WITH A FLANGE

FIELD OF THE INVENTION

The present invention relates to an arrangement for mounting a tube or member provided with a flange in a hole formed in a wall, said arrangement comprising a locking element with at least three peripherally spaced apart seats or shoulders adapted to cooperate with a corresponding number of abutment members which are fixed to the wall and which each have an oblique surface against which portions of the locking element can be applied so that, when said locking element is turned, both the locking element and the tube flange are urged inwardly against the wall in order to fix said tube flange.

NO 152,282 discloses an arrangement of this type in which the abutment members are portions of a ring fixed to the wall, said portions defining slits which form bayonet catches and which are adapted to receive shoulders in the form of projecting fingers on the turnable locking element. Forming these slits in the ring is, however, both complicated and expensive, which renders the entire arrangement costly to manufacture.

SUMMARY OF THE INVENTION

The present invention aims at obviating the above inconveniences in providing an arrangement which is simple and inexpensive to manufacture and which permits rapid and expedient mounting and dismounting of the tube. According to the invention, this is achieved by means of an arrangement which is characterised in that a cam surface is provided adjacent to each seat or shoulder, and that each abutment member is a pin with a conical portion forming said oblique surface and tapering towards the wall to which said pin is fixed and against which the cam surface is applied until said pin engages the seat.

BRIEF DESCRIPTION OF THE DRAWINGS

In the drawings,

FIG. 2 is an enlarged front view of a locking element according to the invention, FIG. 3 is a partial cross-section of a portion of the locking element and of the filter tuber in mounted position, FIG. 4 is a front view of a tool used for turning the locking element, and FIG. 5 is a part sectional side view of the tool in FIG. 4.

DESCRIPTION OF A PREFERRED EMBODIMENT

Figure 1:
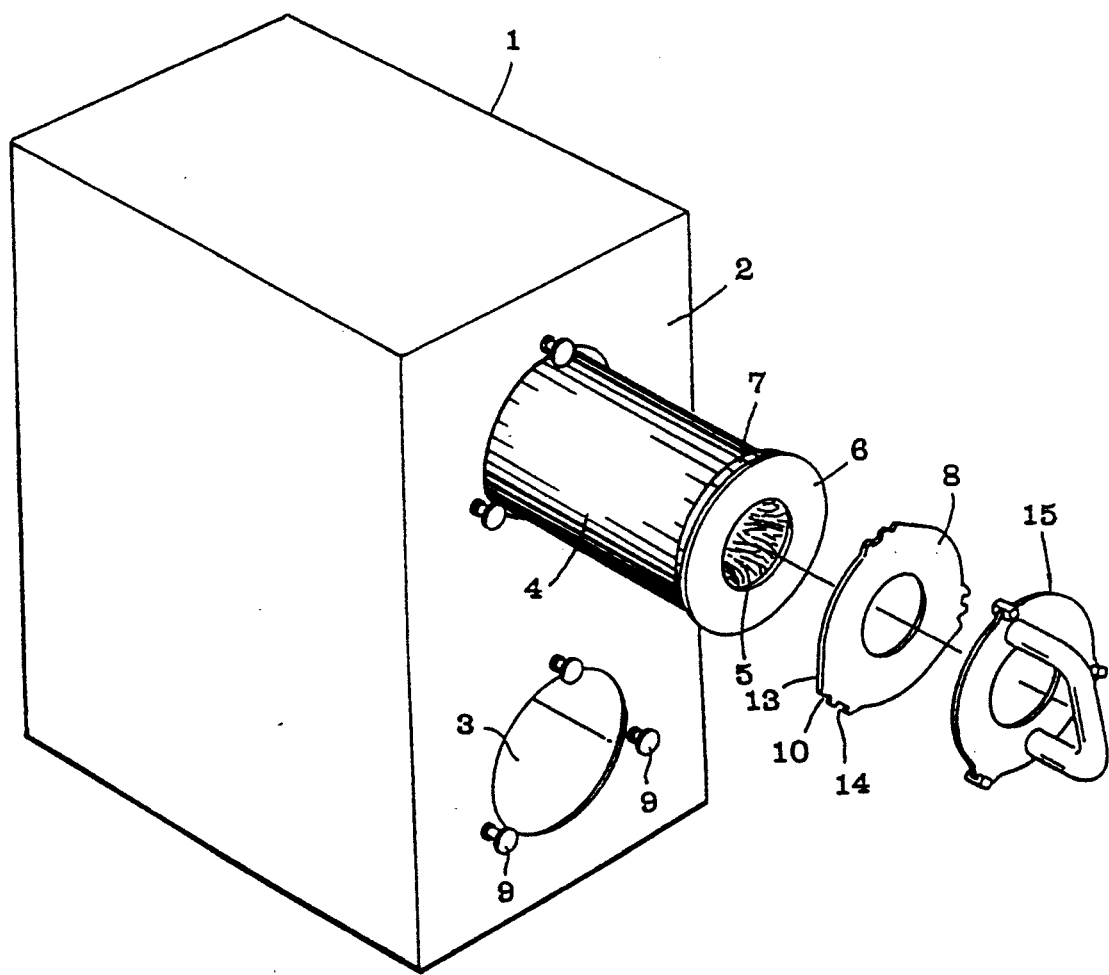
FIG. 1 is an exploded view showing a filter tube in the process of being mounted in the housing of a dust separator by means of the arrangement according to the invention.

In FIG. 1, the housing 1 of a dust separator has a vertical front wall 2 with a number of holes 3 each adapted to receive a filter tube 4. For the sake of simplicity, only two holes are shown in FIG. 1, but in actual practice, the number of holes is usually much larger, e.g. eight, sixteen, etc. Advantageously, the filter tube 4 is of the type described in, for instance, PCT/SE83/OO428, which has an annular flange 6, e.g. of sheet metal, adjacent to an opening 5 in one end of said tube. To provide satisfactory sealing between the flange 6 and the front wall 2, a sealing ring 7 of elastic material, e.g. rubber, is passed onto the filter tube to be located between the flange and the front wall when the filter tube is introduced in its entirety into the housing.

A locking element in the form of a ring 8 adapted to lock the filter tube 4 cooperates with at least three abutment members 9 on the front wall 2. The locking ring 8, which advantageously is made by punching of a metal plate, has a number of peripherally spaced apart seats 10, in this case three seats, the distance between said seats corresponding to the distance between the abutment members 9. As is best shown in FIG. 3, the abutment member 9 is a pin whose one end is fixed to the front wall 2 and whose opposite end has a head 11, a conical portion 12 being arranged adjacent to said head and converging towards the wall 2. The seats 10 of the locking ring 8 (see FIG. 2) may advantageously consist of V-shaped cuts in the periphery of the disc-shaped ring. The periphery of said ring is mainly circular, but a cam surface 13, e.g. in the form of a straight portion, as opposed to the remaining circular periphery, is provided before the seat 10. Furthermore, a recess 14, which in this case is rectangular, is provided in the area behind the seat 10. In actual practice, both the seats 10 and the recesses 14 (as well as the pins 9) may advantageously be equidistantly spaced apart, in this case with a circular pitch of 120°.

FIGS. 4 and 5 are enlarged views showing a tool 15 for turning the locking ring 8. The tool comprises a base plate, e.g. an annular plate 16, formed along its periphery with projections 17 whose shape and position correspond to the shape and position of the recesses 14. In actual practice, the projections 17 may be short pieces of square rods welded to the annular plate 16. A grip portion 18 in the form of a U-shaped tube is also, at its opposite ends, welded to the annular plate 16.

The above arrangement functions in the following manner. When the filter tube 4 is to be mounted, the elastic sealing ring 7 is slipped over the tube, and the locking ring 8 is fitted on the tool 15. The tube is pushed into the housing 1 with the sealing ring 7 placed in the space between the housing front wall 2 and the flange 6. The locking ring 8 is applied against the outer face of said flange and, while approaching the wall, is held in such a manner that each of the locking pins 9 will be located somewhere in the area between the cam surface 13 and the recess 14 immediately before. When the locking ring 8 has entered a plane immediately behind the heads 11 of the pins, it is turned by means of the tool 15 (clockwise in FIG. 2) such that the cam surfaces 13 will engage the conical surfaces 12 of the pins 9. As the cam surfaces 13 go past the three pins 9, the locking ring is gradually pressed against the wall 2, the sealing ring 7 being compressed correspondingly, until the pins finally engage the seats 10 in the locking ring. Thus, the sealing ring will be permanently compressed under a pressure which, because of the pins 9 which are at least three, will be uniformly distributed along the entire ring, such that the sealing action of the sealing ring will be maintained also if the filter tube projecting into the housing 1 is subjected to a certain torque in consequence of its own weight.

It should be observed that, in the assembled state, only the conical portion 12 of the pin 9 is in contact with the V-shaped seat 10, whereas the more slender shank portion of said pin has such a small diameter that it can never contact the portions of the locking ring surrounding the seat. When the filter tube is dismounted, it is therefore easy to release the locking ring by briefly pressing it against the wall and simultaneously turning it by means of the tool 15 to a position in which the locking pins are situated along the circular circumferential portions between the cam surfaces and the recesses 14 immediately before.

Thus, with the arrangement according the invention, filter tubes of the above-mentioned type can be mounted in an extremely rapid and expedient manner ensuring a totally reliable sealing action between the flange of the tube and the housing of the dust separator unit.

It goes without saying that the invention is not restricted to the embodiment described above and shown in the drawings. For example, the invention may be applied to flanged tubes or members other than filter tubes, e.g. an inspection lid in the form of a transparent plate of glass or plastic, which, by means of the locking ring, is pressed against a sealing ring around the hole at issue. The invention can also be used with members which have no openings at the mounting end and in which the ring-shaped locking member 8 could be replaced by a plate without holes. Furthermore, the tool for turning the locking plate can be modified in many ways, e.g. by making the projections on the tool engage with holes in the locking plate proper instead of recesses on the plate periphery. Finally, it should be pointed out that the term "wall", as used in the specification and the claim, should be interpreted in the widest possible sense to comprise, for instance, also flat rings formed with holes and mounted on a wall or the like.

I claim:

1. A mounting arrangement for mounting a member provided with a flange within an opening formed in a wall, said arrangement comprising a member with a flange thereon, a wall with an opening therein for receiving said member and means mounting at least three abutment members to said wall in spaced relationship around said opening and a locking element having a periphery having at least three spaced apart seats on said periphery adapted to cooperate with a corresponding number of said abutment members, each of said abutment members having an oblique surface against which at least a portion of said locking element can be applied whereby when said locking element is turned said locking element engages said abutment members and said locking element and said flange are urged inwardly toward said wall for fixed mounting therewith, said locking element further including a cam surface adjacent to each of said seats, each of said abutment members comprising a pin having a conical portion forming said oblique surface and tapering towards said wall against which said cam surface is applied until said pin engages said seat.

2. The arrangement as set forth in claim 1, wherein said locking element comprises a ring.

3. The arrangement as set forth in claim 2, wherein said seats comprises peripheral V-shaped cuts in said ring.

4. The arrangement as set forth in claim 3, wherein said cam surface comprises a straight portion on said ring.

5. The arrangement as set forth in claim 1, wherein said ring includes a recess.

6. The arrangement as set forth in claim 1, wherein a seal member is positioned intermediate with flange and wall whereby said flange and said locking element are urged against said sealing member thereby compressively urging said seal member against said wall and said flange for fixed contact therewith.

* * * * *